United States Patent [19]

Brandt et al.

[11] 4,068,365

[45] Jan. 17, 1978

[54] LOCKING PULLER DEVICE

[76] Inventors: Paul W. Brandt; Dean S. Somerville, Box 215, both of McHenry, N. Dak. 58464

[21] Appl. No.: 768,338

[22] Filed: Feb. 14, 1977

[51] Int. Cl.$^2$ .............................................. B23P 19/04

[52] U.S. Cl. ...................................................... 29/261

[58] Field of Search .................. 29/261, 259, 260, 262

[56] References Cited

U.S. PATENT DOCUMENTS

| | | | |
|---|---|---|---|
| 1,569,918 | 1/1926 | Flynn | 29/262 |
| 2,303,560 | 12/1942 | Knight | 29/261 |
| 2,889,617 | 6/1959 | Mitcham | 29/261 |
| 4,007,535 | 2/1977 | Brandt et al. | 29/261 |

FOREIGN PATENT DOCUMENTS

| | | | |
|---|---|---|---|
| 775,888 | 10/1934 | France | 29/261 |
| 1,028,372 | 2/1953 | France | 29/261 |

*Primary Examiner*—James L. Jones, Jr.
*Attorney, Agent, or Firm*—Robert E. Kleve

[57] ABSTRACT

The invention comprises an improvement in a locking puller device. The locking puller has three pivotally mounted jaws and a cam ring which moves forward to pivot and lock the jaws about an object. The improvement comprises a projecting lug structure suspended only from the cam ring which projects beneath the under surfaces of the jaws to cam the jaws apart as the cam ring moves rearward with the projecting lug of the cam ring engaging the undersurfaces of the jaws. The under surfaces of the jaws follow a tapered path relative to the movement of the cam ring so as to cam the jaws apart.

3 Claims, 5 Drawing Figures

LOCKING PULLER DEVICE

This invention relates to locking puller devices. This invention is also related to our co-pending U.S. Pat. application Ser. No. 610,412, filed Sept. 4, 1975.

It is an object of this invention to provide a novel cam means for spreading the jaws of the puller device apart automatically.

It is another object of the invention to provide a novel means on the cam ring of the gear puller which cams the jaws together as the cam ring moves forward to cam and lock the jaws, that also automatically cams the jaws apart as the cam ring moves rearward.

Further objects and advantages of the invention will become apparent as the description proceeds and when taken in conjunction with the accompanying drawing wherein.

Briefly stated, the invention comprises a locking puller device having three pivotally mounted jaws and a cam ring which moves forward to cam the jaws of the locking puller together to pivot and lock the nose of the jaws about an object, and which cam ring also has projecting lugs thereon which project around and beneath the under surfaces of the jaws to cam the jaws apart as the cam ring moves rearwardly with the projecting lugs of the cam ring engaging the under surfaces of the jaws and with the under surfaces following a tapered path relative to the movement of the cam ring so as to cam the jaws apart.

Figure 1:
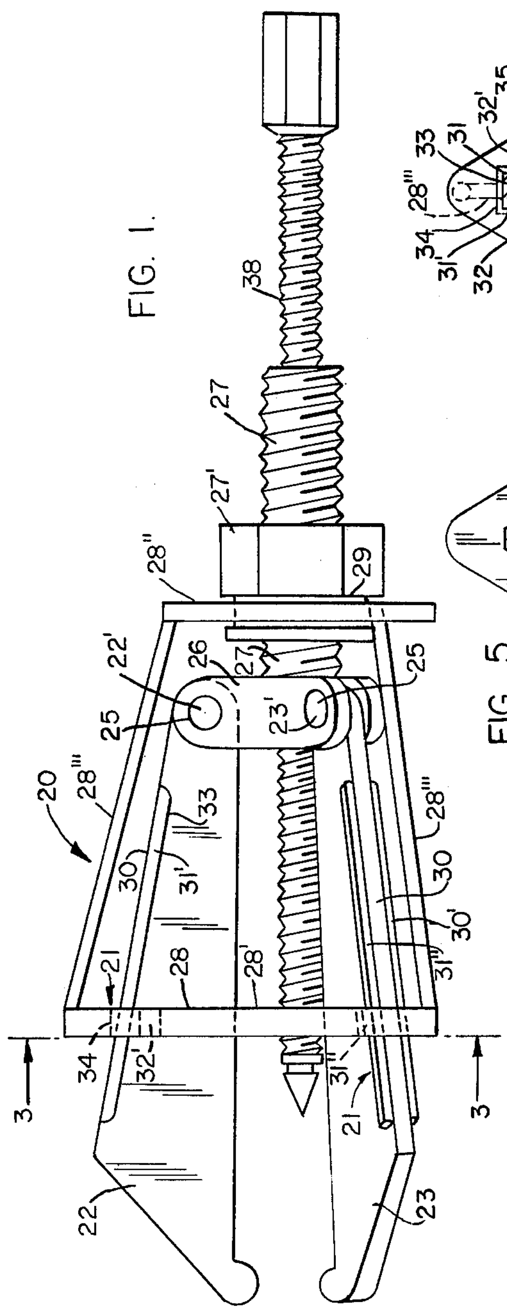
FIG. 1 is a side elevational view of the locking puller device wherein the jaws of the puller device have projecting ridges which engage onto notches in the cam ring to automatically spread the jaws apart and illustrates the cam ring in a forward position with the jaws positioned relatively close together.
Figure 2:
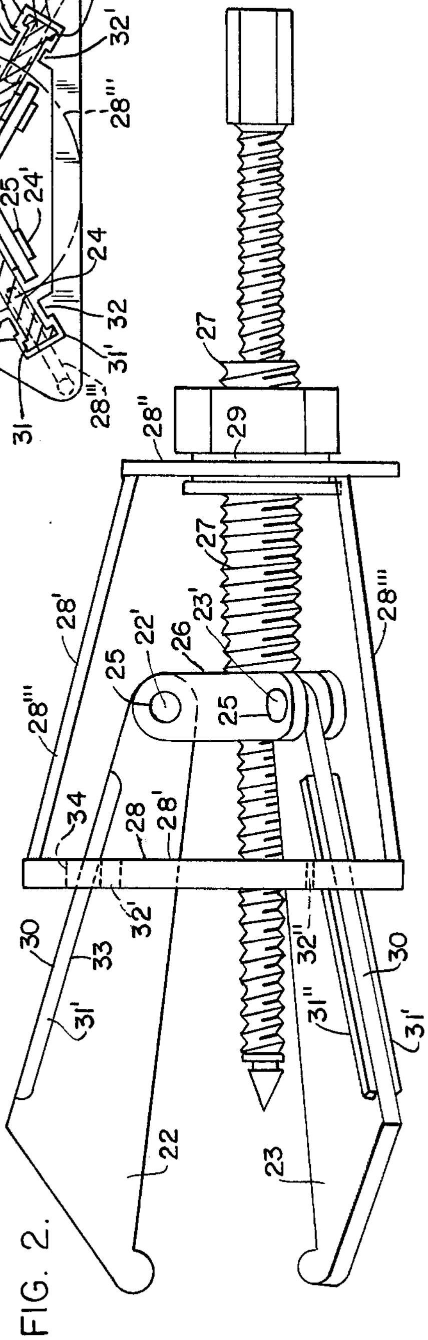
FIG. 2 is a side elevational view of the locking puller device similar to FIG. 1 with the cam ring moved rearward, which has caused the jaws to spread apart by the notches in the cam ring engaging and sliding along the ridges of the jaws.
Figure 3:
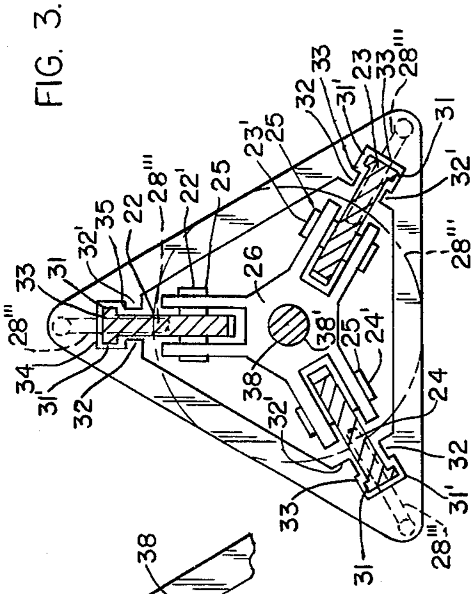
FIG. 3 is a cross-secional view of the locking puller device taken along line 3—3 of FIG. 1.

Referring more particularly to the drawings in FIGS. 1, 2, and 3, the locking puller device 20 is illustrated as having the preferred form of cam lug structure 21. The locking puller device operates identically to that described in our co-pending patent application, Ser. No. 610,412, except that the preferred form of cam ring structure 21 is provided and operates instead of the springs shown in our co-pending application and performs the same function as the springs. The locking puller has three pivotally mounted jaws 22, 23, and 24, which are pivotally mounted at three rearward ends at pivot points 22', 23', and 24' by pins 25 to pivot about the collar 26. The collar has a threaded sleeve 27 fixed to the collar and a nut 27' is threaded onto the sleeve. The cam ring 28 has a front triangular ring 28' which surrounds the jaws 22, 23, and 24, and a ring 28'' mounted in rotatably relation in a groove 29 in the nut 27'. Three braces 28''' are fixed between the cam ring 28' and the ring 28'' to fix the triangular cam ring 28' in fixed relation to the ring 28'' so that rotation of the nut in one direction by means of the grooved connection between the ring and the nut moves the ring, the braces and the triangular ring forward to cause the surfaces 34 of the cam ring to engage against the outer surfaces 30 of the jaws to cam the jaws toward one another to lock the nose of the jaws about an object such as a gear on a shaft, so that threaded rod 38, which is threaded into a bore 38' in the collar and sleeve 27, may be threaded forward to engage the shaft to push the gear rearward relative to the shaft to remove the gear from the shaft, as already described in detail in our co-pending application.

The improvement invention which constitutes the basis of the patent application comprises the cam lug structure 21. The cam lug structure 21 has a pair of elongated projecting ridges 31 and 31' fixed to each of the jaws 22, 23, and 24 along the upper outer surfaces of the jaws, and a pair of projecting lugs 32 and 32' on each of the three corners of the cam ring 28 fixed thereto and projecting inward beneath the ridges 31 and 31' to engage the under surfaces 33 of the projecting ridges 31 and 31'. The projecting lugs 32 by engaging the under surfaces 33 of the projecting ridges 31 and 31' cause the cam ring to spread the jaws apart as the nut us rotated in a opposite direction to move the cam ring reward (left to right when viewed from FIGS. 1 and 2), by the lugs sliding along the under surfaces 33 of the ridges and camming against the ridges 31 and 31' to cam and spread the jaws apart causing them to pivot outwardly about their pivot points 22', 23', and 24'.

FIG. 1 illustrates the jaws with the cam ring moved forward with the noses of the jaws engaged about an object not shown, such as a gear or inner race of a bearing on a shaft, with the upper surfaces 34 engaged against the outer surfaces 30 of the jaws to lock the jaws about the object. FIG. 3 illustrates the cam ring moved rearwardly by the rotation of the nut in the opposite direction to move the cam ring rearward, with the jaws spread apart by the lugs 32 and 32' engaging against the under surfaces 33 of the ridges 31 and 31' to gradually spread the jaws apart as the cam ring moves rearward (left to right when viewed from FIG. 3).

The projecting ridges 31 and 31' have the same taper along the under surfaces 33 as the outer surface 30 of the jaws so to uniformally move the jaws together and spread the jaws apart at generally the same rate of speed.

The notched out areas 36 of the cam ring to surround the ridges of the jaws by the lugs 32 and 32' projucting inwardly are sufficiently larger from the upper surfaces 34 of the notched out areas to the top surfaces 35 of the projecting lugs than the height of the ridges 31 and 31' to provide enough space for the jaws to pivot as the cam ring moves without jamming or wedging with the cam ring.

Thus it will be seen that a novel means of camming the jaws apart has been provided which automatically spreads the jaws apart as the cam ring moves rearwardly in a positive manner enabling the jaws to be removed from an object such as a gear once the gear has been pulled off the shaft.

Figure 4:
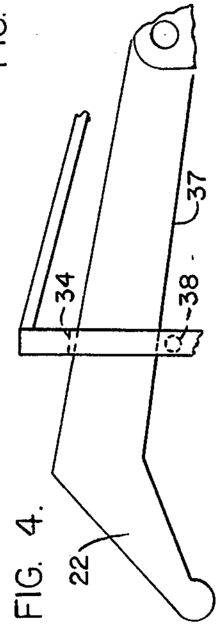
FIG. 4 is a fragmentary side elevational view of a second modified form of camming the jaws apart, illustrating the cam ring and jaw connection.
Figure 5:
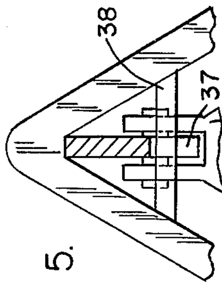
FIG. 5 is a fragmentary front elevational view of the second modified form of camming the jaws apart, illustrating the cam ring and jaw connection.

A second modified form of camming the jaws apart is illustrated in FIGS. 4 and 5. In the second modified form of the invention, the locking puller including the cam ring, braces, and ring is made exactly as shown in the preferred form of the invention, shown in FIGS. 1, 2, and 3, except that jaws 22, 23, and 24 have no projecting ridges, having a uniform horizontal and vertical thickness from the one end to the other and the corners of the cam ring and top surfaces 30 of the jaws are constructed as already described in our co-pending application. The under surfaces 37 of each of the jaws 22, 23, and 24 are uniformally notched out and tapered to follow a path parallel to the outer surface 30 of each of the jaws, as illustrated in FIG. 4. Three pins 39 are fixed to the cam ring, one across each of the three corners of the triangular ring, as illustrated in FIG. 5, so that the pins 38 engage the under surface 37 of each of the jaws, so that as the cam ring moves rearward the pins will engage the tapered under surfaces of each of the jaws to cam the jaws apart in generally the same manner as in the preferred form of the invention.

In both forms of the invention the projecting lugs 32 and 32' in the one form and the pins 39 in the second form are suspended and supported only by the cam ring and the cam ring is supported only by the fixed connection to the three braces 28''' and the three braces are supported only by their fixed connection to the ring 28'', so as to leave the center area of the cam ring relatively open.

It will be obvious that various changes and departures may be made to the invention without departing from the spirit and scope thereof and accordingly, it is not intended that the invention be limited to that specifically described in the specification or as illustrated in the drawing but only as set forth in the appended claims wherein.

What is claimed is:

1. A locking puller device comprising a plurality of pivotally mounted arm-like jaws pivotably mounted to a collar at their rearward ends, a sleeve fixed to said collar and projecting rearwardly, a threaded nut means threaded onto said sleeve, a cam ring forward of the collar surrounding the jaws, braces fixed to the cam ring and extending rearwardly, a ring rotatably mounted to the nut means, said braces having their rearward ends fixed to the ring, projecting lug means mounted to and supported only by the cam ring and projecting from the cam ring radially inward about the outer edge surfaces of the jaws, said jaws having under surfaces, said lug means projecting beneath the under surfaces of the jaws, said jaws having its outer and under surfaces tapered relative to the direction of the cam ring movement, to cause the jaws to move toward one another by engagement with the cam ring on the outer surfaces as the cam ring moves forward or spread apart by the engagement with the cam ring lug means on the under surfaces as the cam ring moves rearward, said cam ring is movable forward by the rotation of the nut means in one direction, with the nut means engaging against the ring to move the ring and as the ring moves, the brace moves thereby moving the ring forward and the cam ring engages the tapered outer surfaces of the jaws to cam the jaws toward one another, and by rotation of the nut means in the opposite direction the nut means engages against the ring which moves the ring which moves the brace which moves the cam ring and projecting lugs rearward, and the projecting lug means engages the under surfaces of the jaws to cam the jaws apart.

2. A locking puller device according to claim 1, wherein each of the jaws has laterally projecting ridges along its outer edge surfaces of the jaws forming a T-shaped ridge structure to each jaw, and with the undersurfaces of the projecting ridges forming the roof of the T-shaped structure forming said undersurfaces of the jaws, and with the projecting lug means forming a C-shape and with ends of the C-shaped lug means projecting under the undersurfaces of the roof of the T-shaped structure and engagement of the undersurfaces of the projecting ridges.

3. A locking device according to claim 1, whereby each of the projecting lug means of the cam ring comprises a pin fixed to the jaws and projects beneath the jaw to engage the undersurfaces of the jaw.

* * * * *

UNITED STATES PATENT AND TRADEMARK OFFICE
CERTIFICATE OF CORRECTION

PATENT NO. : 4,068,365
DATED : January 17, 1978
INVENTOR(S) : Paul W. Brandt et al It is certified that error appears in the above-identified patent and that said Letters Patent are hereby corrected as shown below:

Column 2, line 26, delete "reward" and insert ---- rearward ----;

Column 2, line 50, delete "projucting" and insert ---- projecting ----;

Column 4, line 34, delete "and engagement of" and insert ---- to engage ----;

Column 4, lines 36 and 37, delete "whereby each of" and insert ---- wherein as to each of the jaws ----;

Column 4, line 38, delete "jaws" and insert ---- ring ----.

Signed and Sealed this

*Twenty-second* Day of *May 1979*

[SEAL]

*Attest:*

DONALD W. BANNER
*Commissioner of Patents and Trademarks*

RUTH C. MASON
*Attesting Officer*

UNITED STATES PATENT AND TRADEMARK OFFICE
CERTIFICATE OF CORRECTION

PATENT NO. : 4,068,365

DATED : January 17, 1978

INVENTOR(S) : Paul W. Brandt et al

It is certified that error appears in the above-identified patent and that said Letters Patent are hereby corrected as shown below:

Column 4, line 15, delete "brace moves" and insert ------ braces move -------;

Column 4, line 15, before "ring" insert ----- cam ------;

Column 4, line 20, delete "brace" and insert ---- braces ----.

Column 4, lines 34, 36, 37, and 38 of the Certificate of Correction issued May 22, 1979, should be lines 33, 35, 36, and 37, respectively.

Signed and Sealed this

*Sixteenth* Day of *September 1980*

[SEAL]

*Attest:*

SIDNEY A. DIAMOND

*Attesting Officer* *Commissioner of Patents and Trademarks*